(12) United States Patent
Kannonji

(10) Patent No.: US 6,366,845 B1
(45) Date of Patent: Apr. 2, 2002

(54) FOLLOWING DISTANCE ALARMING APPARATUS AND FOLLOWING DISTANCE DISPLAYING APPARATUS THAT DISPLAY DIFFERENCE BETWEEN MEASURED FOLLOWING DISTANCE AND THAT AT WHICH WARNING IS GIVEN

(76) Inventor: Michihiro Kannonji, 4-16, Sunamichi-cho 2-cho, Sakai-shi, Osaka (JP)

( * ) Notice: Subject to any disclaimer, the term of this patent is extended or adjusted under 35 U.S.C. 154(b) by 0 days.

(21) Appl. No.: 09/670,517

(22) Filed: Sep. 26, 2000

(30) Foreign Application Priority Data

| Sep. 27, 1999 | (JP) | 11-311432 |
| Nov. 12, 1999 | (JP) | 11-359627 |
| Jun. 15, 2000 | (JP) | 2000-219854 |

(51) Int. Cl.[7] .................... B60K 31/00; G01S 13/93
(52) U.S. Cl. ............... 701/96; 701/301; 340/903; 340/435
(58) Field of Search ........... 701/96, 300, 301; 340/903, 435, 436

(56) References Cited

U.S. PATENT DOCUMENTS 5,234,071 A * 8/1993 Kajiwara .................. 180/169
6,119,068 A   9/2000 Kannonji .................. 701/301

FOREIGN PATENT DOCUMENTS

| JP | 61-14587 | 1/1986 |
| JP | 61-91581 | 5/1986 |

* cited by examiner

Primary Examiner—Tan Nguyen
(74) Attorney, Agent, or Firm—McDermott, Will & Emery

(57) ABSTRACT

A following distance displaying apparatus which enables visual confirmation how much more approach between a preceding vehicle and a subject vehicle makes a distance at which an alarm of a following distance alarming apparatus operates, after a lapse of a predetermined time from when the preceding vehicle and the subject vehicle entered a follow-up travel state, indicates an alarm distance at which the alarm of the following distance alarming apparatus operates which is set in advance corresponding to the then following distance to the preceding vehicle and an approach distance representing a difference between the subsequently measured following distance and said alarm distance.

17 Claims, 9 Drawing Sheets

FOLLOWING DISTANCE ALARMING APPARATUS AND FOLLOWING DISTANCE DISPLAYING APPARATUS THAT DISPLAY DIFFERENCE BETWEEN MEASURED FOLLOWING DISTANCE AND THAT AT WHICH WARNING IS GIVEN

BACKGROUND OF THE INVENTION

1. Field of the Invention

The present invention relates to a following distance alarming apparatus for measuring a distance from a vehicle equipped with the following distance alarming apparatus (hereinafter, simply referred to as "subject vehicle") to a vehicle running ahead (hereinafter, simply referred to as "preceding vehicle") to prevent collision of the subject vehicle against the preceding vehicle based thereon, and a following distance displaying apparatus for displaying the following distance and/or its change.

2. Description of Related Art

Vehicles such as automobiles move independently from each other on a road. Therefore, there might occur an accident such as bumping of vehicles. On a superhighway, in particular, the frequency of rear-end collisions is higher and a high vehicle speed is liable to invite serious results.

The major cause of collision is a following distance that is too short. Under these circumstances, apparatuses have been conventionally proposed for preventing a collision accident between a subject vehicle and a preceding vehicle by using a following distance measuring device. The applicant of the present invention also proposed a following distance informing apparatus for informing a change of a following distance in the U.S. Pat. No. 6,119,068.

These related art advantageously allows drivers to cope with a change of the following distance with ease since change of a following distance can be informed of the drivers. The related art, however, has such a problem that when a following distance changes every moment, it is difficult for drivers to instinctively apprehend the change.

SUMMARY OF THE INVENTION

An object of the present invention is directed to improvement of a following distance alarming apparatus such as the above-described rear-end collision alarming apparatus, collision predicting apparatus and following distance informing apparatus and is to provide a following distance alarming apparatus which accurately copes with a following distance changing every moment.

Another object of the present invention is to provide a following distance alarming apparatus enabling operation conditions of each of the above-described apparatuses to be apprehended at a glance to increase practicability and reliability as an index for safety driving.

A following distance measuring apparatus according to one aspect of the present invention for achieving the above objects includes a following distance measuring device, a memory responsive to the detection of a preceding vehicle and a subject vehicle having a follow-up travel state for a predetermined time based on a following distance to the preceding vehicle measured by the following distance measuring device for storing an output signal value from an operation member operative according to a speed control apparatus of the subject vehicle, an alarming apparatus responsive to a distance predetermined corresponding to a following distance at which the follow-up travel state is attained being measured by the following distance measuring device for determining a possibility of collision based on an output signal value from the operation member and an output signal value stored in the memory to output a warning, and a control circuit for, after the follow-up travel state is maintained for a predetermined time, upon another detection of the preceding vehicle and the subject vehicle having the follow-up travel state for a predetermined time, causing the memory to newly store the then output signal value from the operation member and further in response to the measurement of a distance predetermined corresponding to the then following distance and further based on the output signal value from the operation member and the newly stored output signal value, controlling the alarming means to determine a possibility of collision and output a warning.

A following distance displaying apparatus according to another aspect of the present invention includes a following distance measuring device, an alarm generating apparatus, a displaying apparatus capable of displaying a distance at which the alarm generating apparatus operates, and a control circuit for detecting a following distance to a preceding vehicle measured by the following distance measuring device attaining a predetermined following distance to control the alarm generating apparatus to inform the danger of collision, as well as controlling the displaying apparatus to display the distance at which the alarm generating apparatus operates after the preceding vehicle and the subject vehicle maintain a follow-up travel state for a predetermined time.

In addition, a following distance displaying apparatus according to a further aspect of the present invention is one that is intended for a vehicle and used connected with a following distance measuring device and includes a displaying apparatus for displaying a following distance measured by the following distance measuring device, a memory, and a control circuit responsive to an output signal from an operation member operative according to a speed control apparatus of a subject vehicle and responsive to satisfaction of a condition having a predetermined relation with a following distance measured by the following distance measuring device for controlling the displaying apparatus to display, based on the then output signal value from the operation member, a pointer indicative of a change of a signal value from the operation member on the displaying apparatus.

A following distance displaying apparatus according to a still further aspect of the present invention includes a displaying apparatus for displaying a following distance to a preceding vehicle measured by a following distance measuring device, an alarm generating apparatus for generating a warning based on detection of a predetermined following distance, an input device operable by an operator of a vehicle, and a control circuit responsive to operation of the input device for controlling the displaying apparatus to display a distance at which the alarm generating apparatus operates which is determined by a predetermined method, the control circuit controlling the displaying apparatus to display a difference between a distance to the preceding vehicle measured by the following distance measuring device and a distance at which the alarm generating apparatus operates by the operation of the input device.

The foregoing and other objects, features, aspects and effects of the present invention will become more apparent from the following detailed description of the present invention with reference to the accompanying drawings.

DESCRIPTION OF THE PREFERRED EMBODIMENTS

First Embodiment

In the following, embodiments of the present invention will be described in detail with reference to the accompanying drawings.

Figure 1:
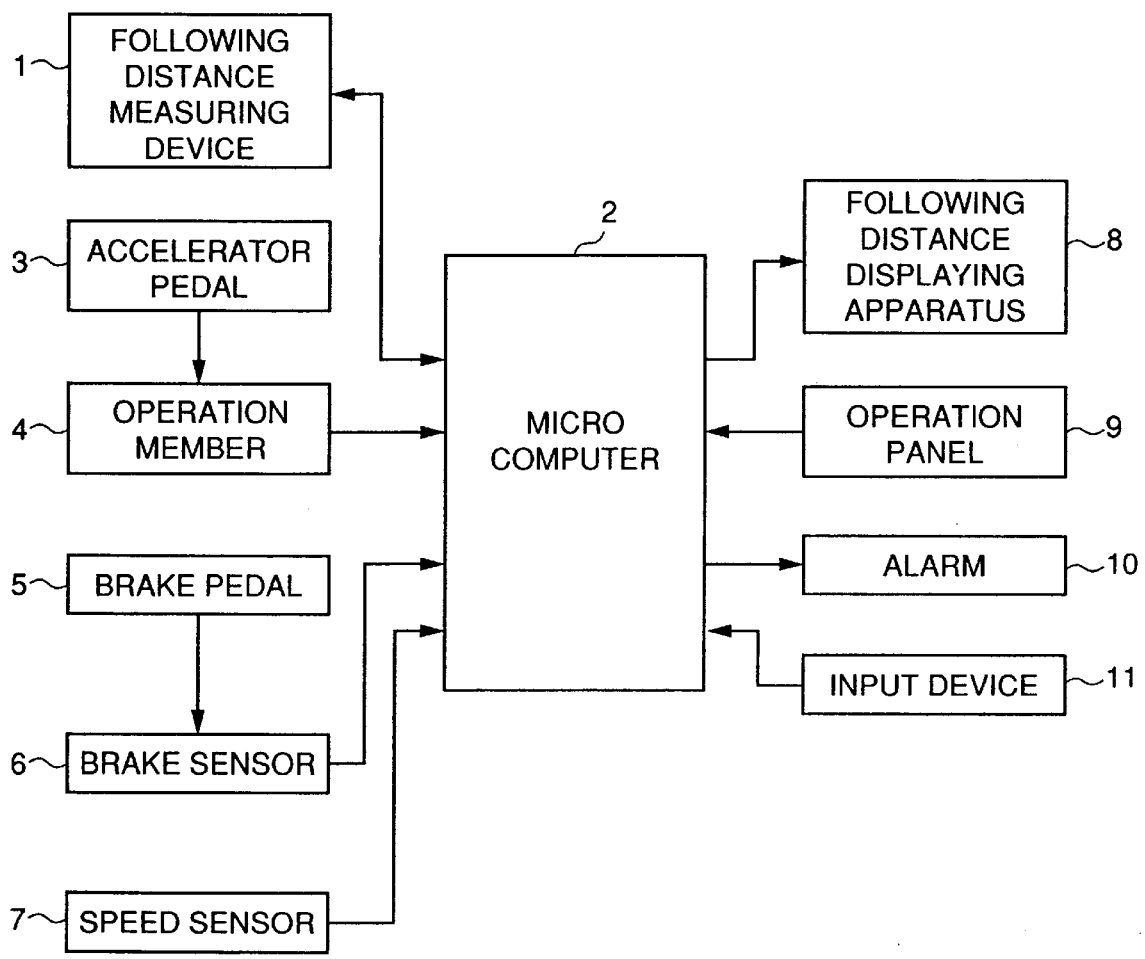
FIG. 1 is a block diagram showing an electrical structure of a collision alarming apparatus according to a first embodiment to which the present invention is applied.

With reference to FIG. 1, a collision alarming apparatus according to a first embodiment of the present invention includes such a following distance measuring device 1 that is used mounted on a vehicle for measuring a distance from a subject vehicle to a preceding vehicle as that of a radar system for measuring a following distance using a laser beam or a millimeter wave or that for measuring a following distance by image processing.

The collision alarming apparatus further includes a micro computer 2 which receives output of the following distance measuring device 1, an operation panel 8 provided in the vicinity of a driver's seat for use at the time of operation of the micro computer 2 by a driver, a following distance displaying apparatus 8 responsive to a signal indicative of a following distance from the micro computer 2 for displaying the following distance, an alarm 10 responsive to an alarm signal from the micro computer 2 for generating a warning sound, and an input device 11 having a switch for use when a driver instructs the micro computer 2 to take out a measurement value of a following distance measured by the following distance measuring device 1.

Output of the following distance measuring device 1 is applied to the micro computer 2. To the micro computer 2, applied are output from an operation member 4 operative according to the operation of an accelerator pedal 3, output from a brake sensor 6 and output from a speed sensor 7. The accelerator pedal and the brake are both apparatuses for controlling a speed of a subject vehicle. The micro computer 2 has a well-known structure including a CPU (Central Processing Unit) and a memory. Although the memory is preferably non-volatile, it may be volatile as long as a power source is backed up. The micro computer 2 realizes the collision alarming apparatus by executing a program having a control structure shown by a flow chart which will be described in the following.

The operation member 4 operates in proportion to an operation amount or an operating pressure of the accelerator pedal 3 as a speed control apparatus to output a signal. The operation member 4 includes a throttle opening sensor for detecting the degree of opening of a throttle valve.

The brake sensor 6 is a sensor for detecting a brake pedal 5 being stepped on. The speed sensor 7 is a sensor for outputting, for example, a wheel speed pulse according to the amount of rotation of an encoder wheel provided at a rotation axis of a tire as a speed signal. As the speed signal, when an automobile is equipped with an anti-lock brake system, its output may be used or a signal of a speed sensor for a speedometer may be used. The speed sensor 7 is also said to operate according to the apparatus for speed control in a broad sense.

The micro computer 2 conducts processing which will be described latter based on a signal from each of the above-described detector and sensor to conduct the processing of displaying the result on the displaying apparatus 8. In addition, the micro computer 2, when determining that the subject vehicle might collide against a vehicle running ahead, operates the alarm 10 to remind a driver of the subject vehicle.

Through the operation panel 9, operation can be executed for changing an initial set value and the like for the micro computer 2.

Figure 2:
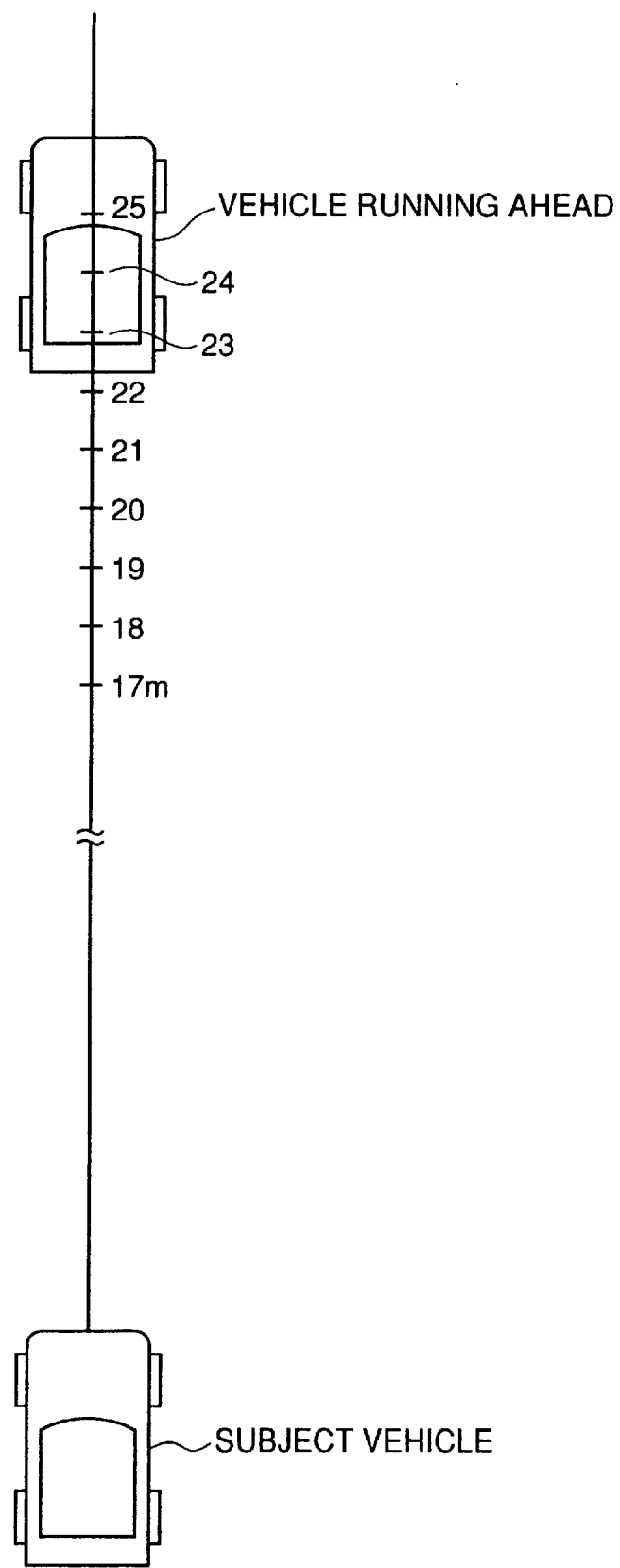
FIG. 2 is an exploded view showing a distance relation between a preceding vehicle and a subject vehicle for use in explaining working of the collision alarming apparatus according to the first embodiment to which the present invention is applied.

FIG. 2 is an exploded view showing a distance relation between ;a preceding vehicle and a subject vehicle for use in explaining working of the collision alarming apparatus in the first embodiment, which now shows, as an example, that the following distance measuring device 1 provided in the subject vehicle measures a following distance of 22 meters to the preceding vehicle.

Figure 3:
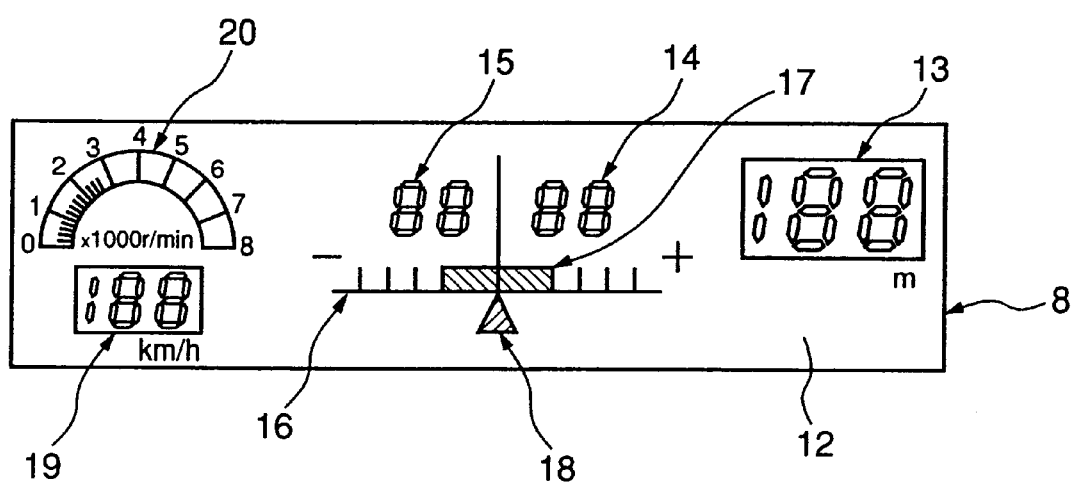
FIG. 3 is a view showing a screen arrangement of a following distance displaying apparatus in the present invention displayed on a liquid crystal display.

FIG. 3 shows a screen of a liquid crystal display 12 of the following distance displaying apparatus 8 for displaying operation conditions of the collision alarming apparatus in the first embodiment. With reference to FIG. 3, the liquid crystal display 12 includes a following distance display portion 13 described above for digitally displaying a following distance to the preceding vehicle measured by the following distance measuring device 1 on the liquid crystal display 12 and an alarm distance display portion 14 for digitally displaying a distance at which the alarm 10 operates when there is danger of collision (crash) between the preceding vehicle and the subject vehicle.

In the example illustrated in FIG. 3, the following distance display portion 13 displays the numeric value "22" reflecting the conditions shown in FIG. 2. When there is danger of collision (crash) of the subject vehicle against the preceding vehicle, the alarm 10 operates, and the alarm distance display portion 14 digitally displays the distance at which the alarm 10 operates (hereinafter, simply referred to as "alarm distance").

The liquid crystal display 12 further includes an approach distance display portion 15 for digitally displaying a difference (simply referred to as "approach distance") between a numeric value displayed by the above-described following distance display portion 13 and a numeric value displayed by the alarm distance display portion 14. The approach distance display portion 15 displays how many more meters from the current following distance measured by the following distance measuring device 1 are left before reaching the distance displayed by the alarm distance display portion 14.

With reference to FIG. 3, the liquid crystal display 12 further includes a scale 16 for indicating a value corresponding to an output signal value from the operation member 4 operative according to the operation of the accelerator pedal 3 which is a speed control apparatus of the subject vehicle, a zone portion 17 provided at the middle of the scale 16 and highlighted by a pattern or a color different from that of the scale 16, a pointer 18 for indicating a value corresponding to an output signal from the operation member 4, a speed display portion 19 responsive to a signal from the speed sensor 7 of the subject vehicle for digitally displaying a speed and a tachometer 20 for displaying the engine speed as a bar graph.

The scale 16 displays graduations of output signal values from the operation member 4 such as a throttle valve opening sensor or an engine speed sensor.

The zone portion 17 shows an allowable range of a difference between an output signal value from the operation member 4 to be compared with a predetermined reference value at the determination of existence and non-existence of danger of collision made by the collision alarming apparatus and the predetermined reference value in question. A width of the zone portion 17 (allowable range of a difference in a signal value) can be arbitrarily increased or decreased by a modulator (not shown) on the operation panel 9 to adjust criteria for determination of danger of collision to driver's driving characteristics.

The pointer 18 indicating a value corresponding to an output signal from the operation member 4 moves rightward and leftward along the scale 16 as the output signal value changes.

Figure 4:
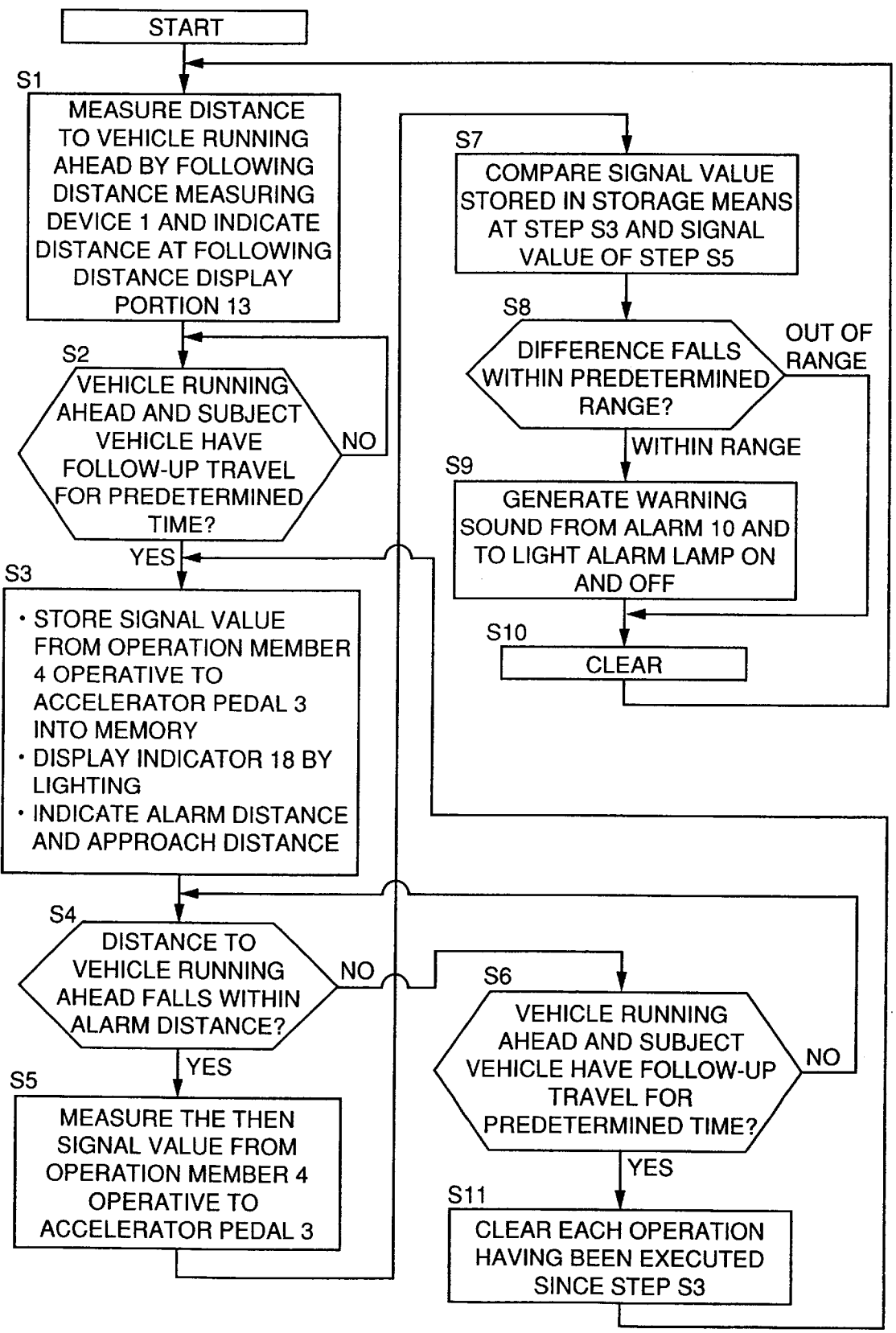
FIG. 4 is a flow chart showing operation of the collision alarming apparatus according to the first embodiment to which the present invention is applied.

FIG. 4 is a flow chart showing operation of the collision alarming apparatus in the first embodiment, and structure and working thereof will be described in the following using the above-described FIG. 1, FIG. 2 and FIG. 3. At Step S1, the following distance measuring device 1 mounted on the subject vehicle measures a following distance to a preceding vehicle. In the following description, assume that the distance is 22 meters as shown in FIG. 2. On the following distance display portion 13 of the liquid crystal display 12, the numeric value of 22 is indicated. The micro computer 2 determines whether a predetermined time (e.g. 2 seconds) has elapsed from when the preceding vehicle and the subject vehicle entered a follow-up travel state based on the measured following distance of 22 meters (Step S2). The predetermined time can be arbitrarily changed by the modulator on the operation panel 9 to be adjusted to driver's driving characteristics.

Determination whether a predetermined time has elapsed from when the follow-up travel state was attained may be made in the following manner. That is, first measure a following distance to the preceding vehicle by the following distance measuring device 1. Furthermore, measure a following distance again after a lapse of a predetermined time. Based on how much the following distance measured later changes from the first measured following distance, determination is made whether a predetermine time has elapsed from when the preceding vehicle and the subject vehicle entered the follow-up travel state. In other words, when the measured following distance to the preceding vehicle remains unchanged for the predetermined time, determination is made that the predetermined time has elapsed from when the follow-up travel state was attained.

Upon detection of a lapse of the predetermined time from when the follow-up travel state was attained at Step S2, the micro computer 2 reads an output signal value from the operation member 4 and stores the value in a memory or a register not shown in the micro computer 2. Furthermore, as shown on the display screen of the liquid crystal display 12 of FIG. 3, the pointer 18 indicative of a change of an output signal value from the operation member 4 is displayed by lighting (Step S3). The indication position of the pointer 18 resides at the center of the zone portion 17 in the scale 16 at the time of first lighting and moves rightward and leftward along the scale 16 according to how much the output signal value from the operation member 4 measured later changes from the output signal value stored in the micro computer 2. More specifically, when the output signal value from the operation member 4 is larger than the output signal value stored at Step 3, it moves to the + side of the scale 16 and when the value is smaller, it moves to the − side. At this time, when the position of the pointer 18 comes out of the zone portion 17, a pattern or a color of the pointer 18 is changed (e.g. the painted-out pointer 18 obtained when the pointer 18 exists within the zone portion 17 is changed into the pointer 18 drawn by a border line when the same comes out of the zone portion 17) to be easily recognized by a driver. Alternatively, in place of changing an indication manner of the pointer 18, the manner of indication of the zone portion 17 is changed as described above.

Furthermore at Step S3, an alarm distance predetermined according to the following distance of 22 at which the follow-up travel state is attained at Step S2 is indicated on the alarm distance display portion 14 of the liquid crystal display 12. The predetermined alarm distance is set in advance corresponding to a first measured following distance and stored in the memory in the micro computer 2. More specifically, based on determination of dangerousness of collision and results thereof at Steps S7 and S8, a distance at which the alarm 10 operates is indicated at Step S9.

In the example illustrated in FIG. 2, first measured and used for the determination whether the follow-up travel state is attained or not is the following distance of 22 meters. For this following distance, assume a distance stored in advance in the memory of the micro computer 2 is, for example, within 17 meters. In this case, the numeric value "17" is indicated in the alarm distance display portion 14. Then, the numeric value indicated in the alarm distance display portion 14 remains unchanged until the flow in operation is cleared (including clear in the middle course of operation). The alarm distance set in advance corresponding to a following distance obtained when a predetermined time has elapsed from when the follow-up travel was attained can be arbitrarily changed by the modulator on the operation panel 9. It is, for example, possible to increase the alarm distance of 17 meters for the above-described following distance of 22 meters to 19 meters or conversely decrease the same to 15 meters. Since the alarm distance can be thus adjusted, the alarm distance can be adapted to driver's driving characteristics.

At the approach distance display portion 15 provided adjacent to the alarm distance display portion 14, indicated is a numeric value (e.g. "5") representing a difference between a numeric value (e.g. "22") indicated in the above-described following distance display portion 13 and a numeric value (e.g. "17") indicated in the alarm distance display portion 14. By the numeric value indicated in the approach distance display portion 15, the driver is allowed to recognize with ease that reduction of the following distance by 5 meters reaches the alarm distance of 17 meters and therefore that the alarm 10 will operate. If another car interrupts between the preceding vehicle and the subject vehicle to make the distance, for example, be 14 m within the alarm distance of 17 meters, the numeric value of −3 will be indicated in the approach distance display portion 15. The approach distance may be set to be a different distance in advance according to a distance indicated in the following distance display portion 13, that is, whether the following distance at which the follow-up travel state is attained is short or long. The approach distance may be, for example, set to be as long as 20 meters when the following distance at which the follow-up travel state is attained is as long as approximately 100 meters and conversely set to be as short as 3 meters when the following distance at which the follow-up travel state is attained is as short as approximately 15 meters.

Thereafter, as the preceding vehicle and the subject vehicle make approaches to each other, the numeric value "22" indicated in the following distance display portion 13 is decremented to 21, 20 and 19, while the numeric value "17" indicated in the alarm distance display portion 14 remains unchanged until the flow in operation is cleared. The numeric value indicated in the approach distance display portion 15 is also decremented to 4, 3 and 2 in line with the change of the numeric value of the following distance display portion 13.

Then, at Step S4, when the following distance between the preceding vehicle and the subject vehicle falls within the alarm distance of 17 meters, the control proceeds to Step S5. In other words, when the numeric value indicated in the approach distance display portion 15 goes to 0 or to a negative numeric value because of interruption of a car, the control proceeds to Step S5.

At Step S5, measure an output signal value from the operation member 4 and at Step S7, compare the output signal value with the output signal value stored at the previous Step S3. Then, based on whether she difference is within a predetermined range or not, determine whether danger of collision exists or not (Step S8). If the difference is within the predetermined range, it is understood that the driver of the subject vehicle fails to take appropriate measures such as stepping back the accelerator pedal 3 although the preceding vehicle and his own vehicle come closer to each other. As a result, at Step S9, in order to inform the driver of danger of collision, the alarm 10 gives a warning sound for a predetermined time and an alarm lamp lights on and off on the liquid crystal display 12.

Determination whether the difference of the output signal values is within an allowable range or not made at Step S8 can be visually checked by a driver based on whether the pointer 18 is located within the zone portion 17 of the scale 16 displayed on the liquid crystal display 12 or not.

After the alarm 10 operates for the predetermined time at Step S9, or when the difference between output signal values compared is outside the allowable range at Step S8, operation of the collision alarming apparatus is cleared (Step S10) to return to the starting point, so that the above-described flow is again executed based on the distance measured by the following distance measuring device 1.

At Step S4, when the distance to the preceding vehicle measured by the following distance measuring device 1 is not within the alarm distance, for example, when the distance measured then is 20 meters, the control proceeds to Step S6. At Step S6, based on the newly measured distance of 20 meters, the micro computer 2 determines similarly to Step S2 whether the preceding vehicle and the subject vehicle had the follow-up travel state for a predetermined time. Then, when the determination is made that the follow-up travel state with the new distance continued for the predetermined time, the output signal value stored in the memory at the previous Step S3, the numeric value indicated in the alarm distance display portion 14 or the approach distance display portion 15, and the display of the pointer 18 are erased at Step S11.

Then, the control again returns to Step S3 to store an output signal value from the operation member 4 in the memory which value is obtained when the predetermined time has elapsed from when the follow-up travel state with the following distance of 20 meters was newly attained. Also at the alarm distance display portion 14, an alarm distance predetermined corresponding to the distance of 20 meters is indicated. For example, if the distance is set to be 15 meters, the numeric value "15" is indicated at the alarm distance display portion 14 and the numeric value "5" is accordingly indicated at the approach distance display portion 15. The pointer 18 is also displayed at the center of the zone portion 17. Thereafter, processing according the above-described flow chart will be repeated.

The reason why a following distance for use in the determination at Step S4 whether a predetermined time has elapsed or not from when the follow-up travel state was newly attained is set to be not 21 meters adjacent to the preciously measured 22 meters but 20 meters is that in the present embodiment, the determination that a predetermined time has elapsed from when the preceding vehicle and the subject vehicle entered the follow-up travel state is made considering that the follow-up travel state is maintained even when a following distance change more or less from a first measured distance. More specifically, when a following distance falls within a predetermined range which is between distances shorter and longer than a first measured distance (e.g. it may be one meter each or may be other distance), it is considered that a follow-up travel state with the first measured following distance is maintained.

When a margin of one meter is set before and after the following distance of 22 meters measured at Step S1, if the following distance is in the range from 21 meters to 23 meters, it will be considered that the follow-up travel state at the first measured distance of 22 meters is maintained. Accordingly, a distance as a criterion for determining a follow-up travel state with the newly measured following distance at Step S4 and Step S6 will be within 20 meters or longer than 24 meters. Then, for the determination of a follow-up travel state attained when the preceding vehicle and the subject vehicle make further approaches to each other to have a following distance of 20 meters, for example, a distance range from 19 meters to 21 meters centered around the distance of 20 meters will be a criterion. In a case where the preceding vehicle and the subject vehicle make further approaches to each other, when the following distance goes to 18 meters, a distance for determining whether the follow-up travel stale is maintained or not will range from 17 meters to 19 meters.

In the first embodiment, used for the determination whether a predetermined time has elapsed or not from when the preceding vehicle and the subject vehicle entered the follow-up travel state are following distances to the preceding vehicle measured twice by the following distance measuring device 1 at predetermined time intervals. The present invention is not limited to such a determination method. For example, the determination may be made by measuring a following distance repeatedly and counting a time period where a first measured following distance is maintained to find whether the counted time reaches a predetermined time or not. Therefore, the determination made at Step S2 and Step S6 of the flow chart of FIG. 4 may be based on whether "measured distance remains unchanged for a predetermined time period?". This is also the case with Step T2 of the flow chart of FIG. 5, Step P2 and Step S6 of the flow chart of FIG. 7 and Step R2 of the flow chart of FIG. 9 which will be described later.

In the above-described embodiment, display of the pointer 18 is made by lighting after a lapse of a predetermined time from when the preceding vehicle and the subject vehicle entered the follow-up travel state (Step S3). The present invention, however, is not limited to such a method. For example, the pointer 18 may be displayed by lighting in response to storage of an output signal value from the operation member 4 at Step S3.

In the above-described embodiment, when the determination is made that there is danger of collision, the alarm lamp is lighted on and off. The present invention, however, is not limited to an apparatus using such a dedicated alarm lamp, and a numeric value indicated as 0 or being negative at the approach distance display portion 15 may be lighted on and off for a predetermined time period.

Furthermore, in the above-described embodiment, a range of the zone portion 17 (output signal value allowable range) can be arbitrarily increased or decreased by the modulator on the operation panel 9 as described above. The present invention, however, is not limited to such an embodiment. For example, different allowable ranges (range of the zone portion 17) may be set in advance according to output signal values stored at Step S3. In this case, display of the zone portion 17 will be made on the liquid crystal display 12 after the output signal value is stored at Step S3.

Second Embodiment

Next, as a second embodiment, operation of a collision alarming apparatus with a newly measured following distance by a method different from that of the first embodiment will be described with reference to the flow chart of FIG. 5. Since a block diagram showing an electrical structure of the collision alarming apparatus according to the second embodiment, a distance relation between a preceding vehicle and a subject vehicle and the contents on a screen of the liquid crystal display 12 of the following distance displaying apparatus 8 are the same as those of the first embodiment, the same components (parts) are indicated by the same reference numerals whose detailed description will not be repeated here. Also, description of the flow chart of FIG. 5 is made only of a part whose contents are different from those of the first embodiment and description of overlapped contents will not be repeated here.

Figure 5:
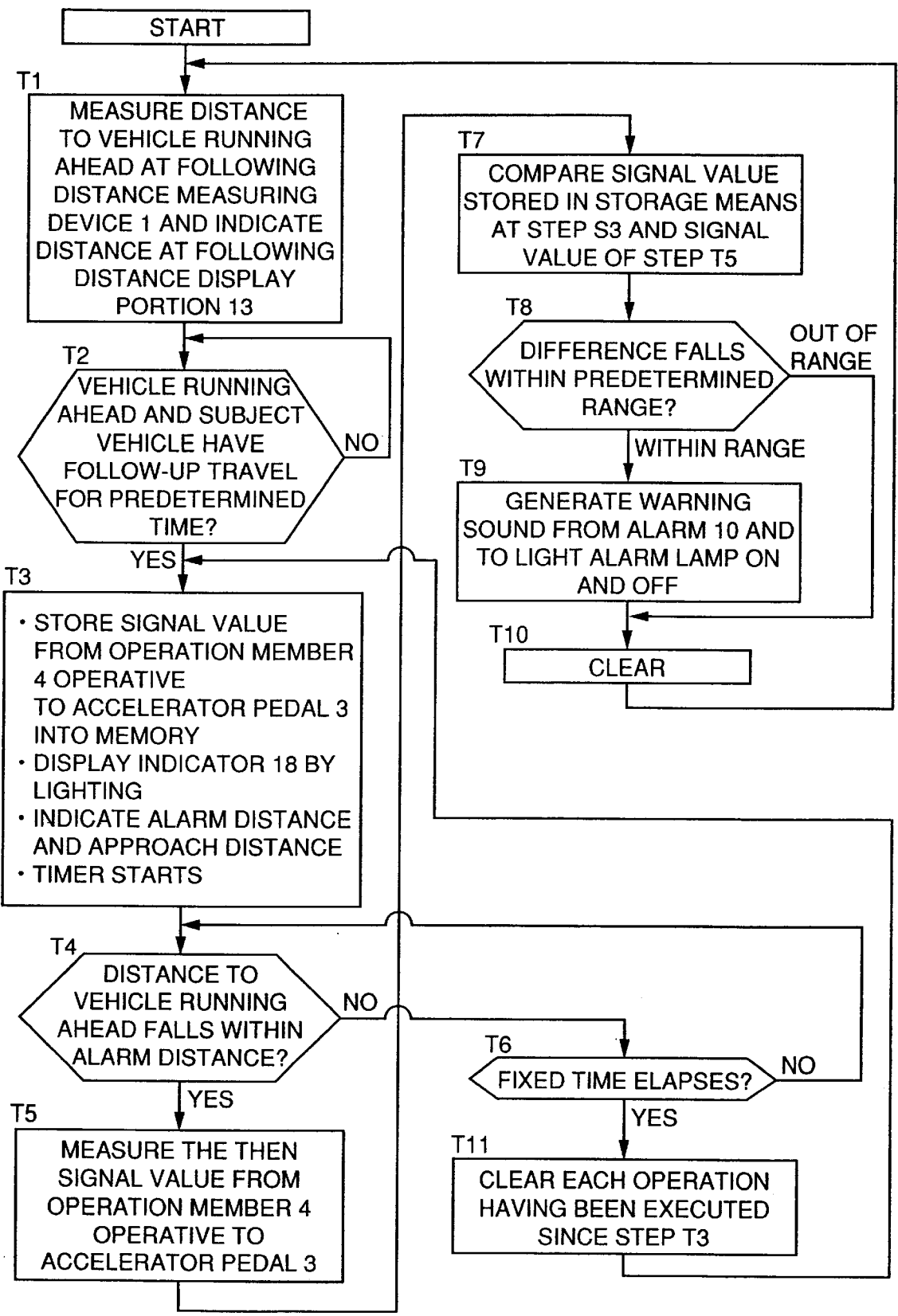
FIG. 5 is a flow chart showing operation of a collision alarming apparatus according to a second embodiment to which the present invention is applied.

In the flow chart of FIG. 5, a distance to the preceding vehicle is measured at the following distance measuring device 1 and the distance is indicated at the following distance display portion 13 of the liquid crystal display 12 (Step T1). At Step T2, based on the measured distance, determination is made similarly to the first embodiment whether the preceding vehicle and the subject vehicle maintain the follow-up travel state for a fixed time, and when the follow-up travel state is maintained, the control proceeds to Step T3. At Step T3, the same contents as those of Step S3 of the first embodiment are executed and the timer in the micro computer 2 starts. Then, when the distance to the preceding vehicle falls within the alarm distance at Step T4, the control proceeds to Step T5. The following processing at Step T7 to Step T10 where clear processing is executed is the same as that of the first embodiment and no detailed description thereof will be therefore repeated here.

At Step T4, if the measured distance is not within the alarm distance, after a lapse of a predetermined time from when the timer started at Step T3 ("YES" at Step T6), all the contents executed at the previous Step T3 are erased (Step T11). At the same time, the control returns to Step T3 to store the then output signal value from the operation member 4 operating according to the operation of the accelerator pedal 3 into the memory. Furthermore, an alarm distance predetermined corresponding to the then measured following distance and an approach distance determined based on by the alarm distance are indicated on the liquid crystal display 12.

For example, in a case where a following distance measured when the determination is made that the predetermined time has elapsed at Step T6 is 20 meters and an alarm distance predetermined therefore is 15 meters, the numeric value "15" is indicated in the alarm distance display portion 14 and the numeric value "5" is indicated in the approach distance display portion 15. As a matter of course, if the distance measured after a lapse of the predetermined time remains unchanged from that of Step T1, the contents displayed first at Step T3 remain unchanged.

At Step T3, the pointer 18 is again lighted at the center of the zone portion 17 and the timer also starts again. Although a fixed time counted by the timer at Step T6 is preferably the same as a time for use in the determination of a follow-up travel state at Step T2, the set time can be also changed arbitrarily by the modulator in the operation panel 9.

Thus, in the second embodiment, every time a predetermined time elapses from when the preceding vehicle and the subject vehicle entered the follow-up travel state, a series of processing is newly executed at the collision alarming apparatus with respect to a measured following distance and an output signal value from the operation member 4.

Third Embodiment

Next, a third embodiment will be described which is applied to the collision predicting apparatuses proposed in Japanese Patent Publication No.4-31074 and Japanese Patent Publication No. 4-79551. Therefore, the collision predicting apparatuses proposed in these Official Gazettes will be first outlined.

In the collision predicting apparatuses proposed in these Official Gazettes, with respect to a distance between a preceding vehicle and a subject vehicle measured by the following distance measuring device 1, a first reference distance and a second reference distance closer to the subject vehicle than the first distance are set in advance. A relative speed between the preceding vehicle and the subject vehicle is obtained from a time period from the detection of the distance between the preceding vehicle and the subject vehicle equaling the first reference distance until the detection of a distance within the second reference distance. When the relative speed is faster than a predetermined speed, determination is made that danger of collision exists to operate the alarm 10. The relative speed between the preceding vehicle and the subject vehicle can be made also based on whether a distance measured after a lapse of a fixed time from when the first reference distance was detected falls within the second reference distance or not.

Figure 6:
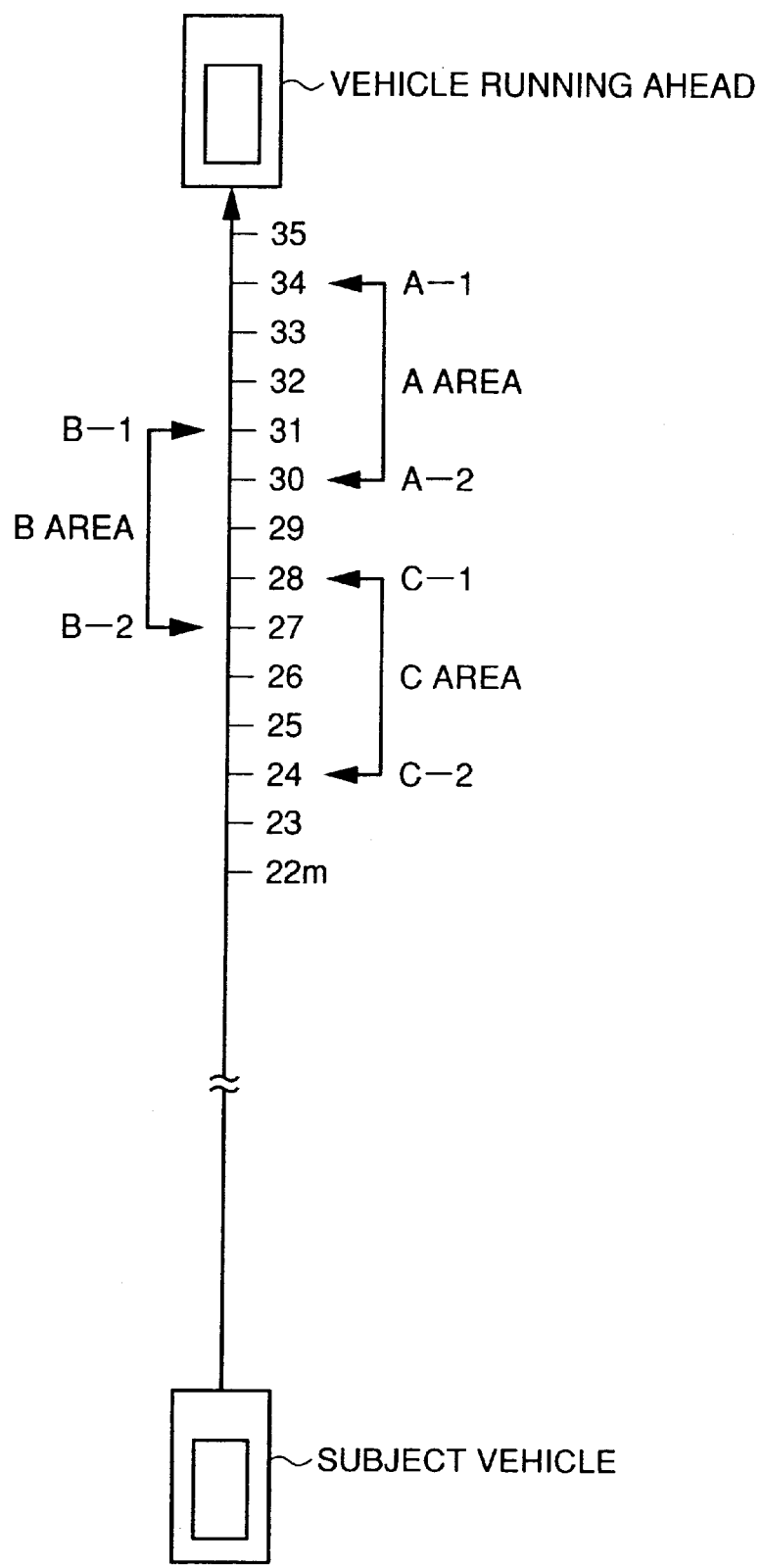
FIG. 6 is an exploded view showing a distance relation between a preceding vehicle and a subject vehicle for use in explaining working of a collision predicting apparatus according to a third embodiment to which the present invention is applied.

FIG. 6 is a diagram showing a distance relation between the preceding vehicle and the subject vehicle for use in explaining operation of the collision predicting apparatus, in which a reference distance for obtaining a relative speed is set in advance with respect to each distance. For example, divisional areas are provided such as A area, B area, C area . . . and information (reference distance) for specifying these areas is set and stored in the micro computer 2 in advance. In the example illustrated in FIG. 6, the first reference distance denoted as A-1 in the A area is set to be 34 m, while the second reference distance denoted as A-2 is set to be 30 meters. In the B area, the first reference distance denoted as B-1 is set to be 31 meters and the second reference distance denoted as B-2 is set to be 27 meters. In the C area, the first reference distance denoted as C-1 is set to be 28 meters and the second reference distance denoted as C-2 is set to be 24 meters. Then, based on a time from the detection of the first reference distance until the detection of the second reference distance at each area, the micro computer 2 calculates a relative speed to determine whether danger of collision exists or not.

Figure 7:
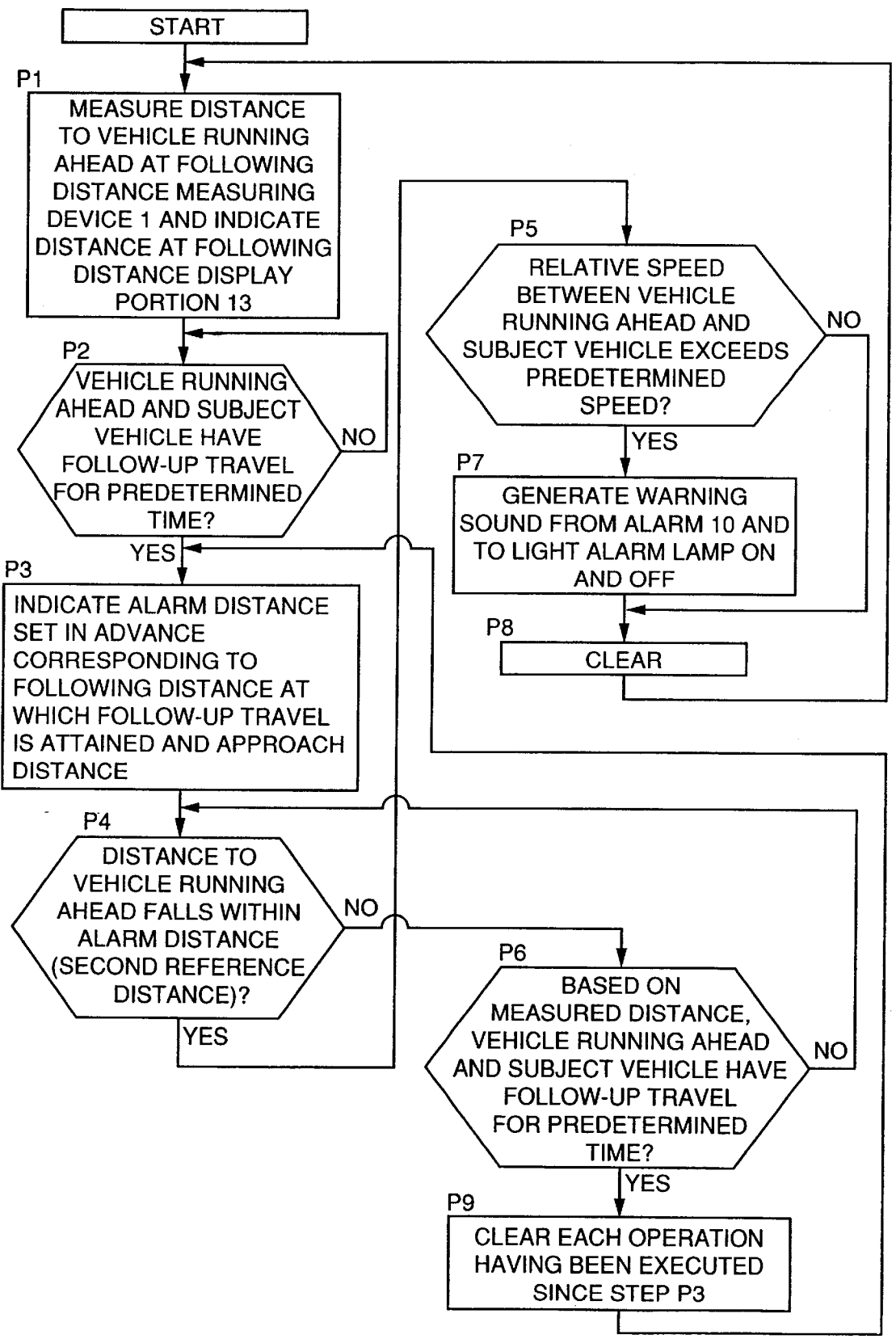
FIG. 7 is a flow chart showing operation of the collision predicting apparatus according to the third embodiment to which the present invention is applied.

FIG. 7 is a flow chart in the third embodiment and its operation will be described with reference to the distance relation in FIG. 6. Since the screen arrangement of the liquid crystal display 12 is the same as that of the first embodiment, the same parts are indicated by the same reference numerals whose detailed description will not be repeated here. At Step P1, measure a distance to the preceding vehicle at the following distance measuring device 1 and the distance is indicated in the following distance display portion 13 of the liquid crystal display 12. Now assume as an example that the distance is 35 meters as shown in FIG. 6. At the following distance display portion 13, the numeric value "35" is indicated. Then, based on the distance of 35 meters, the micro computer 2 determines whether the preceding vehicle and the subject vehicle have a follow-up travel state for a fixed time period as in the first embodiment (Step P2). When the follow-up travel state is maintained, the control proceeds to Step P3. Method of obtaining the follow-up travel state and a distance as a target thereof can be the same as those recited in the first embodiment.

At Step P3, a distance at which the alarm 10 of the collision predicting apparatus operates which is set in advance for the distance measured when the determination is made that the follow-up travel state continues for the predetermined time is indicated in the alarm distance display portion 14 of the liquid crystal display 12. In the example shown in FIG. 6, for the measured distance of 35 meters, the numeric value of 30 meters which is the second reference distance in the A area is indicated in the alarm distance display portion 14. This numeric value remains unchanged until the system in operation is cleared.

Furthermore, at the approach distance display portion 15, the numeric value "5" is indicated which represents the difference between the numeric value "35" indicated in the following distance display portion 13 and the numeric value "30" indicated in the alarm distance display portion 14. As a result, the driver is allowed to visually confirm that 5 meters more approach from the currently measured distance of 35 meters will make the following distance be the distance of 30 meters at which the alarm 10 operates. According to following distances thereafter measured, each numeric value indicated on the liquid crystal display 12 changes as recited in the first embodiment and based on the measured distances, determination is made in succession whether the follow-up travel state is attained or not (Steps P4 and P6). When a relative speed obtained by a time from when a measured distance falls on the first reference distance of 34 meters in the A area until when the same falls within a range of the second reference distance is faster than a predetermined speed, determination is made that there is danger of collision (Step P5). In this case, after the alarm 10 operates at Step P7 as in the first embodiment, the clear processing is conducted (Step P8) to return the control to the starting point.

Based on the measured distances changing, the micro computer 2 in succession determines at Step P4 and Step P6 whether the preceding vehicle and the subject vehicle are at the follow-up travel state. Here, in a case, for example, where the measured distance of 35 meters at Step P1 changes into a following distance of 32 meters because of the subsequent approach and the follow-up travel state continues for a time predetermined based on the distance ("YES" at Step P6), the control proceeds to Step P9. At Step 9, the numeric value of 30 at the alarm distance display portion 14 and the numeric value at the approach distance display portion 15 which have been indicated since Step P3 are erased. Furthermore, calculation of the relative speed in the A area for causing the collision predicting apparatus to operate is also cleared. At the same time, the collision predicting apparatus now starts operation in the B area set in advance for the distance of 32 meters at which the follow-up travel state is newly detected. The same numeric value "27" as that of the second reference distance in the B area which is the distance at which the alarm 10 operates is indicated at the alarm distance display portion 14 and the numeric value "5" representing a difference between the measured distance of 32 meters and the alarm distance 27 meters is indicated at the approach distance display portion 15.

Thus, the third embodiment is directed to the improvement of a collision predicting apparatus for determining, based on a relative speed between a preceding vehicle and a subject vehicle obtained from a time when a distance between both the vehicles coincide with two reference distances set in advance, whether there is danger of collision between the vehicles. More specifically, in the third embodiment, when the follow-up travel state continues for a predetermined time, a distance at which the alarm 10 of the collision predicting apparatus operates which is predetermined corresponding to the then following distance, and an approach distance representing a difference between the currently measured following distance and the alarm distance are indicated on the liquid crystal display 12. Then, when detecting the follow-up travel state continuing for a predetermined time with a new following distance based on a following distance measured in succession, indication of an area where the collision predicting apparatus operates at the previous follow-up travel state and the then alarm distance and approach distance are erased (cleared). At the same time, determination is made whether collision exists or not in the area where the collision predicting apparatus operates which is predetermined corresponding to the new following distance. Numeric values of the alarm distance and the approach distance are indicated on the liquid crystal display 12.

In the third embodiment, the alarm distance and the second reference distance are the same. These may, however, be different distances from each other. For example, to 30 meters of the second reference distance, the alarm distance can be set to be 29 meters. Relationship between these distances should be determined in advance.

Fourth Embodiment

Figure 8:
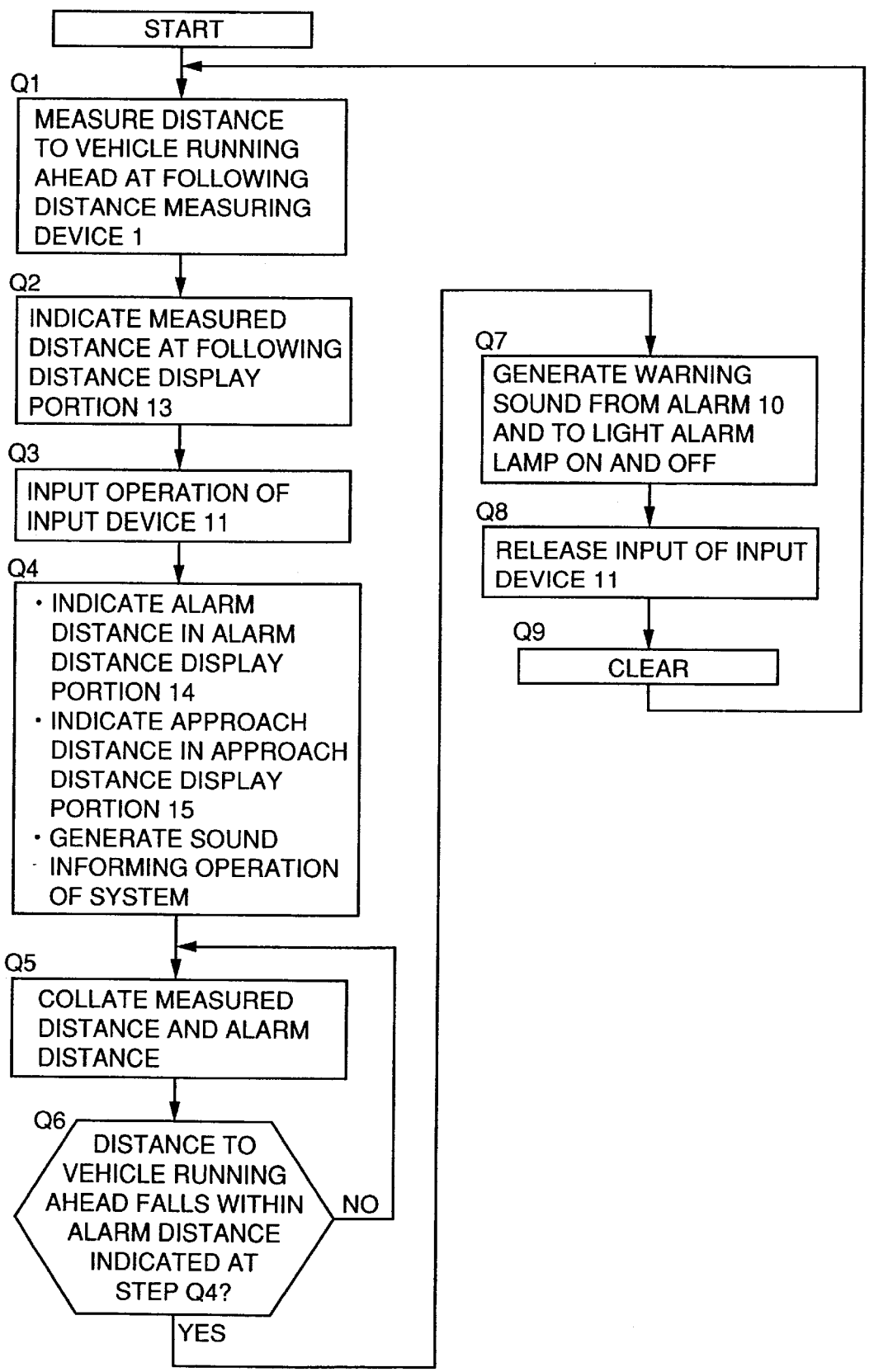
FIG. 8 is a flow chart showing operation of a following distance informing apparatus according to a fourth embodiment to which the present invention is applied.

Next, function and working of a following distance displaying apparatus according to a fourth embodiment will be described with reference to the flow chart of FIG. 8. Since a block diagram showing an electrical structure, a distance relation between a preceding vehicle and a subject vehicle and a screen arrangement of the liquid crystal display 12 of the following distance displaying apparatus according to the fourth embodiment are the same as those of FIG. 1, FIG. 2 and FIG. 3 which have been described in the above first embodiment, the same components (parts) are indicated by the same reference numerals whose detailed description will not be repeated here.

In the flow chart of the following distance displaying apparatus in FIG. 8, when a distance to the preceding vehicle is measured by the following distance measuring device 1 at Step Q1, the distance is indicated in the following distance display portion 13 of the liquid crystal display 12. In the example shown in FIG. 2, the numeric value "22" is indicated in the following distance display portion 13 (Step Q2). When the driver turns ON a switch of the input device 11 near at hard (Step Q3), reading of a measurement value of the measured distance is started. On the alarm distance display portion 14, the numeric value "17" of the alarm distance is indicated which is a distance at which the alarm 10 operates at Step Q7 and which is determined corresponding to the following distance measured at Step Q1. On the approach distance display portion 15, "5" is indicated which represents a difference between the numeric value "22" indicated on the following distance display portion 13 and the numeric value "17" indicated on the alarm distance display portion 14 (Step Q4). A distance relation between the measured distance of 22 meters and the corresponding alarm distance of 17 meters, that is, the numeric value "5" as an approach distance, can be arbitrarily set by the modulator on the operation panel 9 as described in the first embodiment.

As the following distance to the preceding vehicle changes, the numeric values indicated on the following distance display portion 13 and the approach distance display portion 15 are changed accordingly. The numeric value (e.g. "17") indicated on the alarm distance display portion 14 remains unchanged until the flow in operation passes through Step Q9 to conduct clear processing (including a case where distance measurement; is cancelled in the middle course). When the preceding vehicle and the subject vehicle make further approaches to each other to make a determination at Step Q6 that they are within an alarm distance, the numeric value of the approach distance display portion 15 indicates "0". The numeric value is indicated until the input device of the alarm 10 is released at Step Q7 (the driver turns OFF the input switch) (Step Q8). At this time, the alarm lamp is also indicated. When other vehicle interrupts between the subject vehicle and the preceding vehicle, there will be a case where the approach distance display portion 15 indicates a negative numeric value. In this case, the negative numeric value is lighted on and off at Step Q7 as recited in the first embodiment.

Generation of a system operation confirmation sound at Step Q4, comparison between the measured distance and the alarm distance at Step Q5 and processing executed at each of the following steps can be realized with ease by those skilled in the art. Since the following distance informing apparatus operates while input operation (switch ON) of the input device 11 is conducted, if the input operation is stopped (switch OFF) while the system flow is in operation, the processing is cleared (cancelled) wherever the control resides in the flow.

Thus, according to the fourth embodiment, the driver is allowed to indicate an alarm distance and an approach distance on the liquid crystal display 12 at an arbitrary time through operation of the input device 11 as in the first embodiment. Therefore, in the fourth embodiment, unlike the first to third embodiments, there is no need of waiting for the preceding vehicle and the subject vehicle to have the follow-up travel state for a predetermined time. A following distance alarming apparatus is realized which enables the driver to cope with travelling condition quickly. Accordingly, providing this input device 11 also in the rear-end collision alarming apparatuses and the collision predicting apparatuses of the first to third embodiments to proceed to the subsequent steps upon reception of a signal from the input device 11 other than a step for determining whether the follow-up travel state continues for the predetermined time or not enables each of these apparatuses to attain the same effects.

In the fourth embodiment, an approach distance can be arbitrarily set by the modulator on the operation panel 9. The present invention, however, is not limited to the present embodiment. It is, for example, possible to set an approach distance as a function of measured distances in advance.

Also in the fourth embodiment, in place of lighting on and off the alarm lamp, the numeric value "0" indicated on the approach distance display portion 15 may be lighted on and off as in the first embodiment. Furthermore, the alarm 10 operating at Step Q7 may be automatically stopped after a predetermined time of operation independently of the release of the input device 11 at Step Q8 as in the first embodiment. In this case, the processing at Step Q9 may be automatically executed to clear the system, thereby returning the control to the starting point.

Moreover, in the fourth embodiment, the input device 11 is provided in the vicinity of the driver's seat. The present invention, however, is not limited to such an embodiment. For example, implementing the input device 11 by a remote controller to send a signal to a controller (not shown) containing the micro computer 2 allows the input device 11 to be disposed at an arbitrary position easy for the driver to operate.

Figure 9:
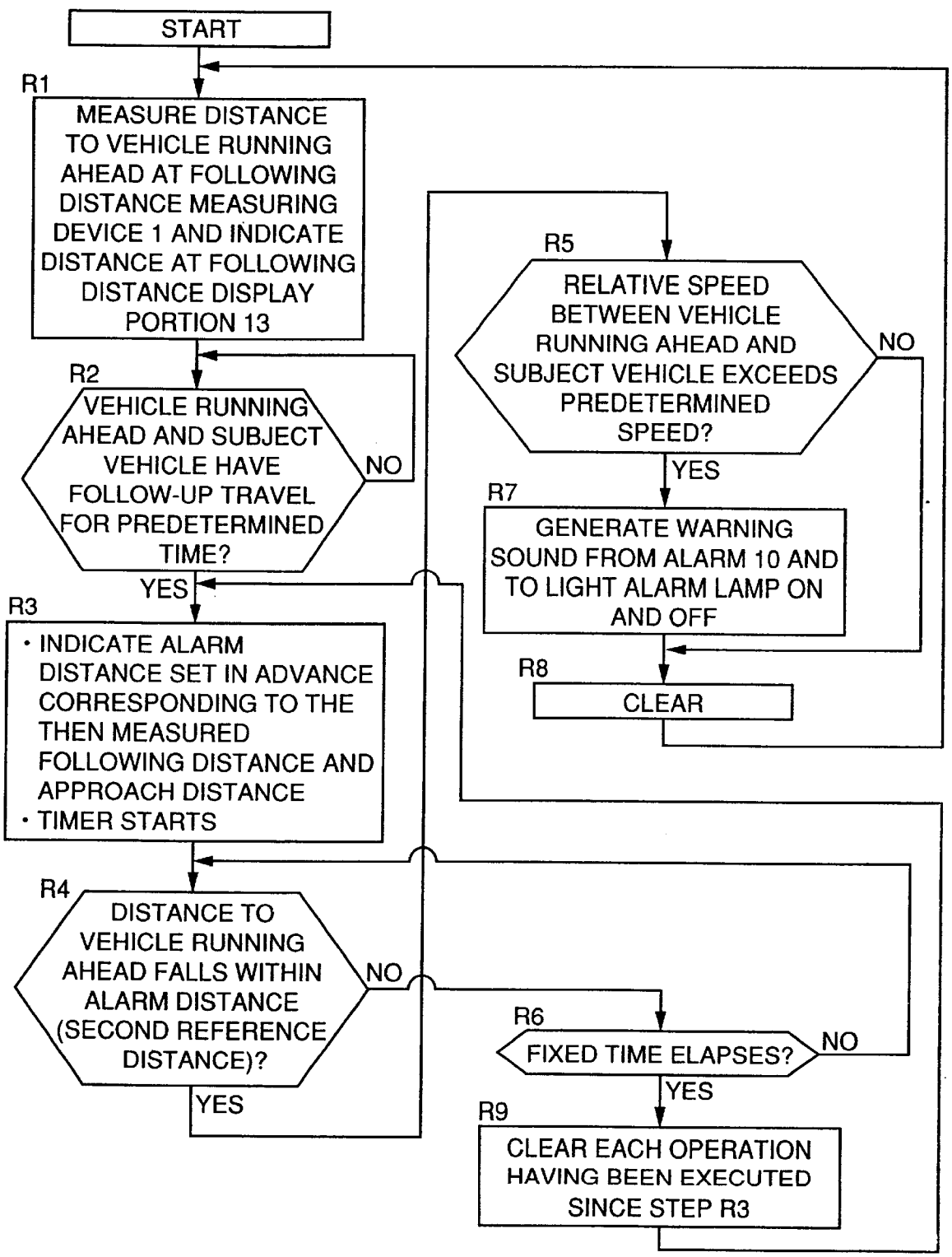
FIG. 9 is a flow chart showing operation of the collision predicting apparatus to which the present invention is applied in other embodiment.

The following distance alarming apparatus and the following distance displaying apparatus of the present invention are applicable not exclusively to the rear-end collision alarming apparatus and the collision predicting apparatus or the following distance informing apparatus shown in the above-described examples. In the flow chart of the collision predicting apparatus of the third embodiment shown in FIG. 7, for example, the contents of Step P6 may be changed into those presented at Step T6 of the flow chart of FIG. 5. FIG. 9 shows a flow chart for the case. Since the contents of each part of FIG. 9 are as those already described, no detailed description thereof will be repeated here.

In addition, indication of an alarm distance and an approach distance is also applicable to following distance alarming apparatuses of other structures than those of the above-described embodiments. Known is, for example, a following distance alarming apparatus in which the alarm 10 operates based on detection of the preceding vehicle and the subject vehicle having a safe following distance predetermined according to the speed of the subject vehicle. Also in this following distance alarming apparatus, a safe following distance set in advance according to a speed of the subject vehicle, that is, an alarm distance at which the alarm 10 operates, and an approach distance representing a difference between a following distance to the preceding vehicle and said alarm distance, can be indicated when the preceding vehicle and the subject vehicle have the follow-up travel state for a predetermined time. In addition, an alarm distance set in advance according to the then speed of the subject vehicle and an approach distance may be indicated through input operation of the input device 11 as recited in the fourth embodiment.

Furthermore, apparatuses of the respective embodiments may operate only when predetermined conditions are satisfied. For example, when the speed of the subject vehicle is faster than a predetermined speed, the apparatuses may operate only when an output signal value from the operation member 4 operating according to the operation of the accelerator pedal 3 exceeds a predetermined value. Moreover, in place of these modifications, or in addition to these modifications, the apparatus may stop operation when other predetermined conditions are satisfied while it is in operation. In a case, for example, where while the apparatus is in operation, a signal from the brake sensor 6 continues for a fixed time period or where a following distance has not been measured continuously for a fixed time period, the processing may be cancelled. It should be said that although such a modification might cause demerits of making processing more complicated, increasing apparatus costs and the like, great effects can be expected in view of prevention of traffic accidents.

In this case, informing a driver of the reason why the processing is cancelled or the reason why the alarm 10 fails to operate produces more effects. For this purpose, for example, an indicator lamp equivalent to the liquid crystal display 12 may be lighted. As a displaying method, when the processing is cancelled by a signal from the brake sensor 6, a mark symbolizing the brake may be displayed on the liquid crystal display 12 for a fixe time period.

In addition, in the first and the second embodiments, the operation member 4 operative according to the operation of the accelerator pedal 3 as a speed control apparatus of the subject vehicle is a throttle valve opening sensor. The present invention, however, is not limited thereto. The operation member 4 may be any member whose signal output amount changes according to the operation of the accelerator pedal 3, such as an air flow meter provided in an intake manifold for detecting the volume of air sucked into an engine, a vacuum sensor for detecting a pressure of an intake manifold, an engine speed sensor for detecting an engine speed or a touch sensor attached to the accelerator pedal 3. Other than those, for example, a battery voltage changing according to the operation of the accelerator pedal 3 may be used as an output signal value from the operation member 4.

According to the present invention, after the preceding vehicle and the subject vehicle have a follow-up travel state for a predetermined time, that is, after a measured following distance to the preceding vehicle remains unchanged for the predetermined time, every time the follow-up travel state continuing for the predetermined time is newly detected, or every lapse of the predetermined time from when the follow-up travel state was first attained, based on the then measured following distance and an output signal value from the operation member 4, operation conditions of the following distance alarming apparatus are changed. As a result, an automobile collision preventing apparatus capable of accurately coping with travel conditions can be provided.

In addition, in the following distance displaying apparatus, after the follow-up travel state is maintained for a predetermined time or by the input operation by the driver, displayed are an alarm distance at which the alarm 10 operates which is determined in advance corresponding to the then measured following distance or the then speed of the subject vehicle, and an approach distance representing a difference between the subsequently measured distance and the alarm distance. Therefore, the driver is allowed to recognize with ease how many more meters are left before reaching the distance at which the alarm 10 operates.

Moreover, when the pointer 18 indicative of a change of an output signal value from the operation member 4 is located outside the range of the zone portion 17 of the scale 16, changing indication contents of an indication light such as the pointer 18 or the zone portion 16 makes it possible to visually recognize with ease whether conditions of determination whether danger of collision exists or not are satisfied or not. These display functions enable a driver to at a glance recognize operation conditions of the following distance alarming apparatus with respect to the preceding vehicle. The present invention therefore serves as an index to prevent careless rear-end collision accidents etc., thereby contributing to traffic safety.

Although the present invention has been described in detail, it is clearly understood that the same is by way of illustration and example only and is not to be taken by way of limitation, and that the present invention is limited only by the terms of the appended claims.

What is claimed is:

1. A following distance alarming apparatus comprising:
   a following distance measuring device,
   a memory responsive to the detection of a preceding vehicle and a subject vehicle having a follow-up travel state for a predetermined time based on a following distance to the preceding vehicle measured by said following distance measuring device for storing an output signal value from an operation member operative according to a speed control apparatus of the subject vehicle,
   an alarming apparatus responsive to the measurement of a distance predetermined corresponding to a following distance at which said follow-up travel state is attained by said following distance measuring device for determining a possibility of collision based on an output signal value from said operation member and an output signal value stored in said memory to output a warning, and
   a control circuit for, when detecting the preceding vehicle and the subject vehicle newly having the follow-up travel state for the predetermined time after said follow-up travel state is maintained for the predetermined time, causing said memory to newly store the then output signal value from the operation member and further responsive to the measurement of a distance predetermined corresponding to the then following distance and further based on an output signal value from said operation member and the newly stored output signal value, controlling said alarming means to determine a possibility of collision and output a warning.

2. The following distance alarming apparatus according to claim 1, wherein said control circuit erases the output signal value from the operation member previously stored in said memory in response to the detection of the follow-up travel state being newly maintained for the predetermined time.

3. A following distance displaying apparatus comprising:
   a following distance measuring device,
   an alarm generating apparatus,
   a displaying apparatus capable of displaying a distance at which said alarm generating apparatus operates, and
   a control circuit responsive to the detection of a following distance to a preceding vehicle measured by said following distance measuring device equaling a predetermined following distance for controlling said alarm generating apparatus to inform danger of collision, as well as controlling said displaying apparatus to display a distance at which said alarm generating apparatus operates after the preceding vehicle and a subject vehicle have a follow-up travel state for a predetermined time.

4. The following distance displaying apparatus according to claim 3, wherein said distance at which said alarm generating apparatus operates which is indicated by said displaying apparatus is a distance set in advance corresponding to a following distance between the preceding vehicle and the subject vehicle obtained when said follow-up travel state is maintained for the predetermined time.

5. The following distance displaying apparatus according to claim 4, wherein said control circuit controls said displaying apparatus to display a difference between a distance to the preceding vehicle measured by the following distance measuring device and a distance at which said alarm operates.

6. The following distance displaying apparatus according to claim 4, wherein said control circuit controls said displaying circuit to, when after the preceding vehicle and the subject vehicle maintain the follow-up travel state for the predetermined time, the follow-up travel state continuing for the predetermined time is newly detected, erase indication of a distance at which said alarm operates made when the follow-up travel state was previously attained and indicate a distance at which the alarm operates which is set in advance corresponding to a following distance obtained when the follow-up travel state is newly maintained for the predetermined time.

7. The following distance displaying apparatus according to claim 3, wherein said distance at which said alarm generating apparatus operates which is indicated by said displaying apparatus is a distance set in advance corresponding to a speed of the subject vehicle obtained when said follow-up travel state is maintained for the predetermined time.

8. The following distance displaying apparatus according to claim 7, wherein said control circuit controls said displaying apparatus to display a difference between a distance to the preceding vehicle measured by the following distance measuring device and a distance at which said alarm operates.

9. The following distance displaying apparatus according to claim 7, wherein said control circuit controls said displaying apparatus to, when after the preceding vehicle and the subject vehicle maintain the follow-up travel state for the predetermined time, the follow-up travel state continuing for the predetermined time is newly detected, erase indication of a distance at which said alarm operates made when the follow-up travel state was previously attained and indicate a distance at which the alarm operates which is set in advance corresponding to a speed of the subject vehicle obtained when the follow-up travel state is newly maintained for the predetermined time.

10. A following distance displaying apparatus for a vehicle which is used connected with a following distance measuring device, comprising:
a displaying apparatus for displaying a following distance measured by said following distance measuring device,
a memory, and
a control circuit responsive to an output signal from an operation member operative according to a speed control apparatus of a subject vehicle and responsive to conditions having a predetermined relation with a following distance measured by said following distance measuring device being satisfied for controlling said displaying apparatus to display a pointer indicative of a change of a signal value from said operation member on said displaying apparatus with the then output signal value from said operation member as a criterion.

11. The following distance displaying apparatus according to claim 10, wherein a position at which said pointer indicative of a change of an output signal value is first indicated is at the center of a zone portion indicative of an allowable range of a difference in an output signal value set in advance for determining a possibility of collision.

12. The following distance displaying apparatus according to claim 10, wherein said control circuit controls said displaying apparatus to change a manner of indication related to said indicator by said displaying apparatus when the indication position of said pointer indicative of a change of an output signal value comes out of a range of the zone portion indicative of an allowable range of a difference in an output signal value set in advance for determining a possibility of collision.

13. The following distance displaying apparatus according to claim 12, wherein said control circuit controls said displaying apparatus to change a manner of indication of said pointer by said displaying apparatus when the indication position of said pointer indicative of a change of an output signal value comes out of the range of the zone portion indicative of an allowable range of a difference in an output signal value set in advance for determining a possibility of collision.

14. The following distance displaying apparatus according to claim 12, wherein said control circuit controls said displaying apparatus to change a manner of indication of said zone portion by said displaying apparatus when the indication position of said pointer indicative of a change of an output signal value comes out of the range of the zone portion indicative of an allowable range of a difference in an output signal value set in advance for determining a possibility of collision.

15. A following distance displaying apparatus comprising:
a displaying apparatus for displaying a following distance to a preceding vehicle measured by a following distance measuring device,
an alarm generating apparatus for generating a warning based on the detection of a predetermined following distance,
an input device operable by an operator of a vehicle, and
a control circuit responsive to the operation of said input device for controlling said displaying apparatus to display a distance at which said alarm generating apparatus operates which is determined by a predetermined method, wherein said control circuit controls said displaying apparatus to display a difference between a distance to the preceding vehicle measured by said following distance measuring device and a distance at which said alarm generating device operates in response to operation of said input device.

16. The following distance displaying apparatus according to claim 15, wherein said distance at which said alarm generating apparatus operates which is indicated by said displaying apparatus is a distance set in advance corresponding to a following distance obtained when operation of said input device is conducted.

17. The following distance displaying apparatus according to claim 15, wherein said distance at which said alarm generating apparatus operates which is indicated by said displaying apparatus is a distance set in advance corresponding to a speed of a subject vehicle at the time of input operation of said input device.

* * * * *